(12) United States Patent  
Yang

(10) Patent No.: US 7,720,495 B2  
(45) Date of Patent: May 18, 2010

(54) METHOD AND DEVICE FOR REMOTE CONTROLLING A WIRELESS COMMUNICATION DEVICE UTILIZING A TEXT MESSAGE

(76) Inventor: Chun-Chieh Yang, 3F, No. 17-2, Lane 232, Hulin St., Taipei City (TW)

( * ) Notice: Subject to any disclaimer, the term of this patent is extended or adjusted under 35 U.S.C. 154(b) by 390 days.

(21) Appl. No.: 11/461,777

(22) Filed: Aug. 2, 2006

(65) Prior Publication Data

US 2007/0032252 A1 Feb. 8, 2007

(30) Foreign Application Priority Data

Aug. 2, 2005 (TW) .............................. 94126232 A

(51) Int. Cl.  
*H04W 4/00* (2009.01)

(52) U.S. Cl. .................. 455/466; 455/425; 455/567; 455/412.1; 709/206

(58) Field of Classification Search .................. 455/466, 455/3, 401, 408, 423–425, 403, 567, 550.1, 455/562.2, 412.1; 709/203–207, 220–222  
See application file for complete search history.

(56) References Cited

U.S. PATENT DOCUMENTS 6,970,698 B2 * 11/2005 Majmundar et al. ......... 455/466
7,296,156 B2 * 11/2007 Marmigere et al. ......... 713/170
7,447,510 B2 * 11/2008 Celik et al. .............. 455/412.1
7,499,699 B2 * 3/2009 Rodriguez et al. .......... 455/425
2004/0235424 A1 11/2004 Kim
2005/0273183 A1 * 12/2005 Curt et al. ...................... 700/22
2006/0178135 A1 * 8/2006 Jiang et al. ................ 455/414.1
2007/0032252 A1 * 2/2007 Yang .......................... 455/466
2007/0167176 A1 * 7/2007 Heikkinen et al. .......... 455/466
2007/0190995 A1 * 8/2007 Wang et al. ................. 455/419
2008/0167002 A1 * 7/2008 Kim et al. .................... 455/411

FOREIGN PATENT DOCUMENTS

| CN | 1610436 A | 4/2005 |
|---|---|---|
| TW | I231697 | 4/2005 |
| TW | 200522696 | 7/2005 |

* cited by examiner

*Primary Examiner*—Kamran Afshar  
*Assistant Examiner*—Ezana Getachew  
(74) *Attorney, Agent, or Firm*—Perkins Coie LLP

(57) ABSTRACT

A method for remote controlling a wireless communication device by a message includes the following steps: the wireless communication device receives a message; and the wireless communication device executes a corresponding operation according to the data stored in the TP-User-Data (TP-UD) field or the data stored in the TP-Protocol-Identifier (TP-PID) field. A user can control the wireless communication device to perform functions like increasing volume or switching from a silent mode to a sound mode, or even switching the mobile phone off, through transmitting a text message to the mobile phone.

29 Claims, 2 Drawing Sheets

METHOD AND DEVICE FOR REMOTE CONTROLLING A WIRELESS COMMUNICATION DEVICE UTILIZING A TEXT MESSAGE

BACKGROUND OF THE INVENTION

1. Field of the Invention

The present invention provides a method and device for remote controlling a wireless communication device utilizing a text message, and more particularly, to a method and device for remote controlling a wireless communication device according to a data of a TP-User-Data (TP-UD) or a TP-Protocol-Identifier (TP-PID) stored within a text message.

2. Description of the Prior Art

Highly developed information communication systems exist in our modern information society. Electronic devices are widely utilized in every area of daily life. For instance, the utilization of a convenient and lightweight mobile phone device has become an indispensable mode of communication. Users of the mobile phone can easily exchange and share information, share their experiences, and opinions through the convenience afforded by the mobile phone device. Mobile phone technology has progressed tremendously in recent years and various types of mobile phones are continuously developed. The increasing utilization of mobile phones has created a corresponding demand in their production. Mobile phones are quickly becoming a very common communication device. As the technology of mobile phones begins to mature, it is apparent that the trend is moving towards smaller multi-functional phones. The important issues now involve how to better design a more personalized mobile phone for the user to utilize.

When a user is looking for a misplaced mobile phone, the user usually locates the mobile phone through hearing the ring tone of the mobile phone. The user simply performs the dialing operation utilizing the phone number associated with the missing mobile phone. However, if the mobile phone is set to a silent mode, the above-mentioned method is not effective. Another problem arises when the mobile phone is left behind or otherwise forgotten in a public space. If in this situation the mobile phone rings, due to either an incoming call or an activated alarm, the mobile phone will be the cause of unwanted noise pollution. Additionally, when the mobile phone is left behind or otherwise forgotten in a public space, the mobile phone may be picked up by strangers and calls may be placed, which results in expensive phone bills. Therefore, designing a method of remote controlling a mobile phone, where the mobile phone is capable of executing actions such as switching from a silent mode to a ringing mode or switching off, is an important issue to be solved.

SUMMARY OF THE INVENTION

The claimed invention provides a method and device for controlling a wireless communication device according to a data of a TP-User-Data (TP-UD) or a TP-Protocol-Identifier (TP-PID) stored within a text message to solve the above-mentioned problem.

The claimed invention discloses a method for remote controlling a wireless communication device by utilizing a text message, the method comprises the following steps: the wireless communication device receiving the text message, and the wireless communication device executing a corresponding operation according to a data of a TP-User-Data (TP-UD) or a TP-Protocol-Identifier (TP-PID) stored within the text message.

The claimed invention discloses a wireless communication device capable of remote control operation, the wireless communication device comprises a wireless communication module for receiving a radio signal, and a logic unit for controlling the wireless communication module to execute a corresponding operation according to a data of a TP-User-Data (TP-UD) or a TP-Protocol-Identifier (TP-PID) stored within a text message received by the wireless communication module.

The advantage of the claimed invention can solve the problem of controlling the mobile phone when the mobile phone is not with its user. For example, the claimed invention utilizes a text message to remote control the mobile phone to execute operations such as volume increase or switching from a silent mode to a sound mode, hence the mobile phone can be located through a ring tone by dialing the mobile phone number; furthermore the claimed invention can utilize the text message to remote control the mobile phone to switch off so that noise pollution is not caused when the mobile phone is left in a public space and rings from either an incoming call or from an alarm previously activated, also the claimed invention can prevent strangers from placing unwanted phone calls using the mobile phone.

Furthermore, the claimed invention is capable of remote controlling the wireless communication device by utilizing the text message transmission method under the modern short message service (SMS) system, there is no requirement to modify the structure of the text message transmission, hence the claimed invention can provide an effective approach to remote control the mobile phone.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
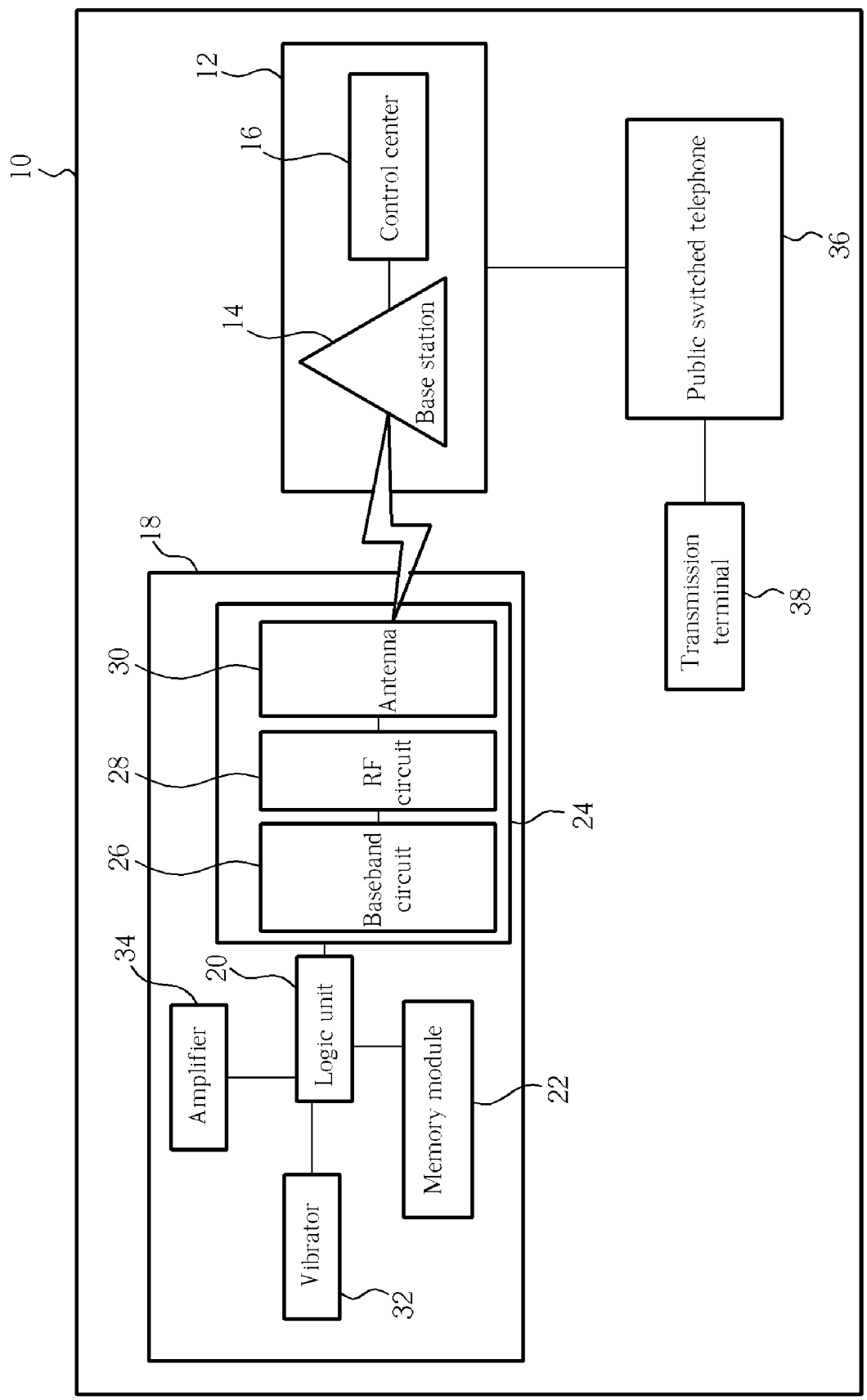
FIG. 1 illustrates a functional block diagram of a communication system.

Please refer to FIG. 1. FIG. 1 illustrates a functional block diagram of a communication system 10. The communication system 10 can be a global system for mobile communication system (GSM). The communication system 10 includes a telecommunication system service terminal 12 for providing user communication service, where the telecommunication system service terminal 12 includes a base station 14 for receiving radio signals and a control center 16 for controlling operations of the telecommunication system service terminal 12. The communication system 10 further includes a wireless communication device 18, where the wireless communication device 18 is a mobile phone capable of wireless communication transmission within a service range of the telecommunication system service terminal 12. The wireless communication device 18 includes a logic unit 20 for controlling operations of the wireless communication device 18, a memory module 22 for storing data of the wireless communication device 18 where a remote control password is stored. In order to realize the wireless communication function, the wireless communication device 18 further includes a wireless communication module 24 where the wireless communication module 24 includes a baseband circuit 26, an RF circuit 28, and an antenna 30. The baseband circuit 26 encodes electronic communication signals, transmitted from the logic unit 20, into appropriate baseband signals and transmits the baseband signals to the RF circuit 28. Next, the RF circuit 28 modulates and transmits the baseband signals through the antenna 30 in a wireless manner. The RF circuit 28 can also receive RF signals through the antenna 30 and demodulate the RF signals into baseband signals, and the baseband circuit 26 decodes the baseband signals into communication signals to be transmitted back to the logic unit 20, hence the wireless communication function is completed. The wireless communication device 18 further includes a vibrator 32 and an amplifier 34 which are interfaces for notifying a user when the wireless communication device 18 receives an incoming call. The communication system 10 further includes a public switched telephone (PSTN) 36, and a transmission terminal 38, which can either be a mobile phone capable of sending text messages or a website capable of sending text messages.

Figure 2:
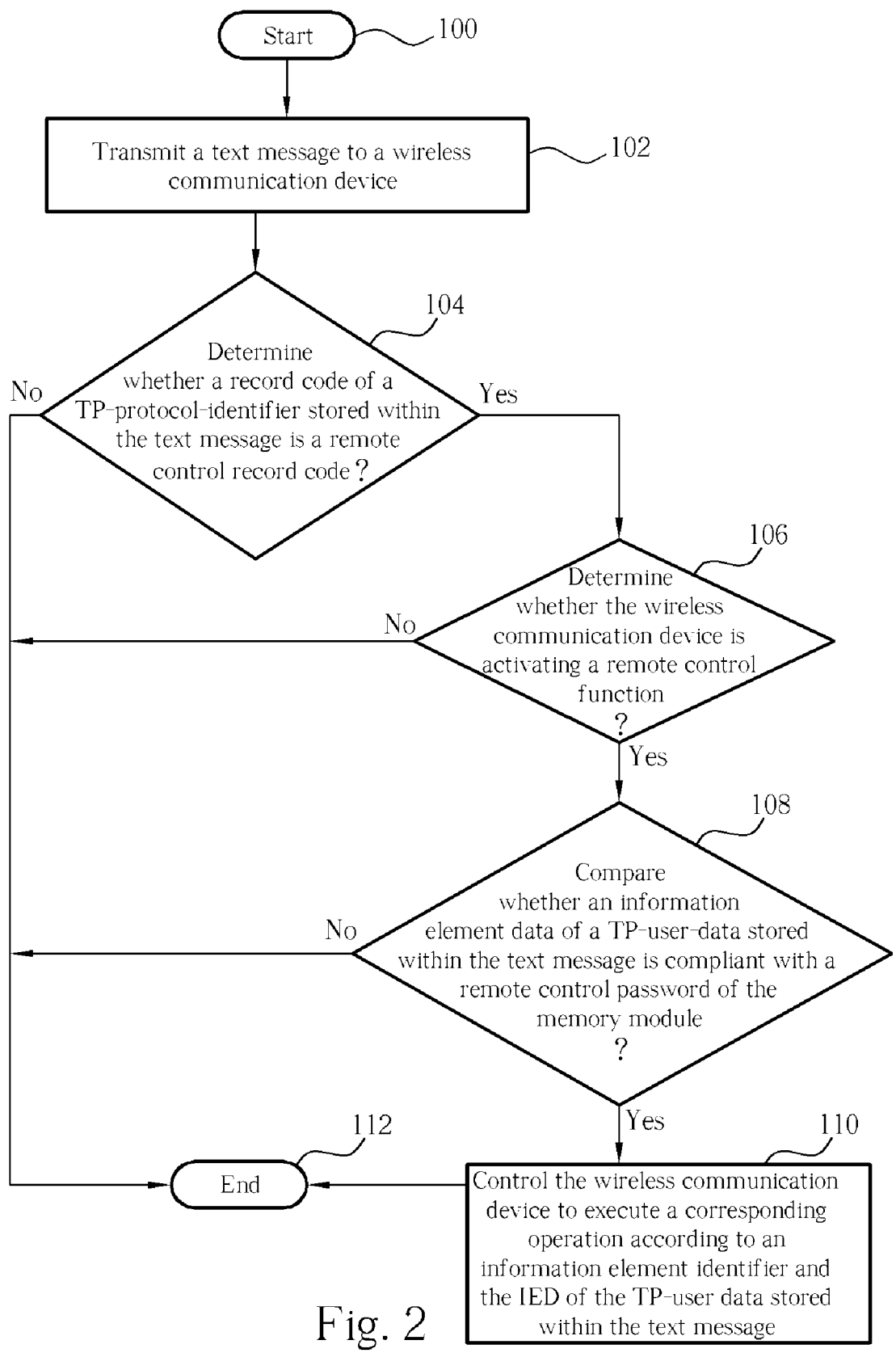
FIG. 2 illustrates a flowchart of the present invention utilizing a text message to remote control a wireless communication device.

Please refer to FIG. 2. FIG. 2 illustrates a flowchart of the present invention utilizing a text message to remote control a wireless communication device 18. The method of the present invention includes the following steps:

Step 100: start;

Step 102: the transmission terminal 38 transmits a text message to the wireless communication device 18 through the PSTN 36 and the telecommunication system service terminal 12;

Step 104: the logic unit 20 of the wireless communication device 18 determines whether a record code of a TP-protocol-identifier (TP-PID) stored within the text message is a remote control record code, if so execute step 106, if not execute step 112;

Step 106: determine whether the wireless communication device is activating a remote control function; if so, execute step 108; if not, execute step 112;

Step 108: the logic unit 20 of the wireless communication device 18 compares whether an information element data (IED) of a TP-user-data (TP-UD) stored within the text message is compliant with a remote control password of the memory module 22; if so, execute step 110; if not, execute step 112;

Step 110: the logic unit 20 of the wireless communication device 18 controls the wireless communication device 18 to execute a corresponding operation according to an information element identifier (IEI) and the IED of the TP-UD stored within the text message; and Step 112: end.

Following is a further explanation of the above-mentioned flowchart in detail. Firstly, the transmission terminal 38 is capable of sending a text message of remote control information, and the text message is transmitted to the wireless communication module 24 of the wireless communication device 18 through the PSTN 36 and the telecommunication system service terminal 12. Secondly, the RF circuit 28 of the wireless communication module 24 then demodulates the RF signals corresponding to the text message received by the antenna 30 into baseband signals. Lastly, the baseband circuit 26 then decodes the baseband signals into communication signals to be transmitted back to the logic unit 20. The standard of the text message can be defined as ETSI TS 23.040 where the content includes the TP-PID field and TP-UD field, and the TP-PID field represents the type of text message capable of selecting a predetermined reserve value storing the remote control text message information in the field. For example, according to the standard of ETSI TS 23.040 version 5.6.1, under the circumstances where bit 7=0, bit 6=1 are selected, the values of bit 5 through bit 0 is the reserve value of 0x48. The reserve value can be the remote control text message type. Additionally, the TP-UD is utilized for defining a control command and a password required by a safety mechanism. For example, according to the standard of ETSI TS 23.040 version 5.6.1, the IEI of TP-UD defines the reserve value 0x23 which represents an operation field, and when the corresponding IED value is 0x0000, it indicates that there should either be an increase to a full volume level of the amplifier of the wireless communication device 18 or it indicates to turn on the sound. When the corresponding IED value is 0x0001, it indicates that the wireless communication device 18 should be switched off. Finally, the IEI of TP-UD defines the reserve value 0x24, which represents a remote control password field, and the corresponding IED is utilized for storing the password value.

The logic unit 20 of the wireless communication device 18 determines whether the record code of the TP-PID of the text message is a remote control record code. For example, similar to the previous example, the TP-PID value is checked whether it is 0x48, when the record code of the TP-PID of the text message is determined to be a remote control record code, it indicates that the text message is a remote control text message and the latter remote control operation will be executed, but if the record code of the TP-PID of the text message is determined not to be a remote control record code, then the text message is not a remote control text message and it may only be a normal text message, hence no latter operation will be executed.

Next, the logic unit 20 of the wireless communication device 18 determines whether the wireless communication device 18 is activating the remote control function, which is to check whether the variable of accepting the remote control function is to activate; if activating is true, then the latter remote control operation will be executed; if not activating, it indicates that the wireless communication device 18 did not accept any code for allowing itself to be remote controlled, hence no latter operation will be executed.

Next, the logic unit 20 of the wireless communication device 18 compares the information element data (IED) to the TP-UD stored within the text message. If these are compliant with the remote control password of the memory module 22, similar to the like operation in the above example when checking whether the password value stored in the IED of IEI 0x24 of the corresponding TP-UD is compliant with the remote control password set in the wireless communication device 18. If the check result is compliant with the remote control password stored within the memory module 22, then the safety mechanism is successfully passed and the latter operation will be executed. If the check is not compliant with the remote control password stored within the memory module 22, then the safety mechanism is not successfully passed and the latter operation will not be executed.

Lastly, if each of the compliance checks passes with the above determining flowchart, the logic unit 20 of the wireless communication device 18 controls the wireless communication device 18 to execute the corresponding operation according to the IEI and the IED of the TP-UD stored within the text message. Similar to the above example, the logic unit 20 can extract the control command of the IED of the IEI 0x23 of the corresponding TP-UD, when the IED value is 0x0000, the logic unit 20 can control the wireless communication device 18 to execute functions such as: increasing the volume of the amplifier 34 or switching from a silent mode to a sound mode; if the IED value is 0x0001, then the logic unit 20 can control the wireless communication device 18 to execute an operation of switching off. Additionally, the control command corresponding to the IED value can be other control commands depending on settings and requirements.

The TP-PID value of the remote control text message type, the IED of the TP-UD stored in the remote control password, and the IED of the TP-UD stored in the control command of the above are capable of utilizing an undefined reserve value of text message data, which the present invention is capable of utilizing for remote controlling the wireless communication device under the modern SMS architecture by utilizing text messages, hence there is no requirement to further modify the architecture of the remote control text message.

In comparison to the prior art, the method of the present invention, that is the utilizing of a text message to remote control a wireless communication device and a wireless communication device thereof is able to solve the situational problem occurring when the mobile phone is misplaced and the user wants to control it, for example, the user can utilize a text message to remote control the mobile phone to execute operations such as increasing the volume or switching from a silent mode to a sound mode, in this way, the user can locate the mobile phone through the ring tone by dialing its phone number; furthermore, the user can utilize a text message to remote control the mobile phone to execute a switch off operation to prevent the misplaced mobile phone from causing noise pollution from incoming calls or an alarm previously activated and also the user can prevent calls being made when the mobile phone is picked up by strangers after having been misplaced. Thus, the present invention is capable of remote controlling the wireless communication device under the modern SMS architecture by utilizing text messages, and there is no requirement to further modify the architecture of the remote control text message, hence the present invention can provide an effective approach to remote control the mobile phone.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for allowing control of a wireless communication device via a text message, the method comprising:
   receiving a text message at a wireless communication device;
   determining at the wireless communication device whether a record code of a TP Protocol Identifier (TP-PID) stored within the text message is a remote control record code;
   if the record code of the TP-PID stored within the text message is the remote control record code, executing an operation at the wireless communication device corresponding to TP-User-Data (TP-UD) stored within the text message; and
   if the record code of the TP-PID stored within the text message is not the remote control record code, displaying the text message on the wireless communication device.

2. The method of claim 1 wherein executing an operation at the wireless communication device corresponding to TP-User-Data (TP-UD) comprises executing the corresponding operation according to an information element identifier (IEI) and an information element data (IED) of the TP-UD stored within the text message.

3. The method of claim 2 wherein executing an operation at the wireless communication device corresponding to TP-User-Data (TP-UD) comprises increasing a broadcast volume of the wireless communiation device.

4. The method of claim 2 wherein executing an operation at the wireless communication device corresponding to TP-User-Data (TP-UD) comprises switching the wireless communication device from a silent operational mode to a non-silent operational mode.

5. The method of claim 2 wherein executing an operation at the wireless communication device corresponding to TP-User-Data (TP-UD) comprises powering off the wireless communication device.

6. The method of claim 1 wherein determining at the wireless communication device whether a record code of a TP Protocol Identifier (TP-PID) stored within the text message is a remote control record code comprises:
   comparing whether an IED of the TP-UD stored within the text message is compliant with a remote control password stored in a memory module of the wireless communication device; and
   if the IED of the TP-UD is compliant with the remote control password executing an operation according to the data of the TP-UD stored within the text message.

7. A wireless communication device, comprising:
   a wireless communication module configured to receive a radio signal; and
   a logic unit configured to
      determine whether a record code of a TP Protocol Identifier (TP-PID) stored within a text message received by the wireless communication module is a remote control record code; and
      control the wireless communication module and execute an operation according to TP-User-Data (TP-UD) stored within the text message if the record code of the TP-PID stored within the text message is the remote control record code.

8. The wireless communication device of claim 7 wherein the logic unit is configured to execute the operation according to an information element identifier (IEI) and an information element data (IED) of the TP-UD stored within the text message.

9. The wireless communication device of claim 8, further comprising an amplifier, and wherein the logic unit is configured to increase a broadcast volume of the amplifier according to the IED.

10. The wireless communication device of claim 8, further comprising an amplifier, and wherein the logic unit is configured to switch the amplifier from a silent operational mode to a non-silent operational mode according to the IED.

11. The wireless communication device of claim 8 wherein the logic unit is configured to power off the wireless communication device according to the IED.

12. The wireless communication device of claim 7, further comprising a memory module configured to store a remote control password, and wherein the logic unit is further configured to
   compare whether an information element data (IED) of the TP-UD stored within the text message is compliant with the remote control password; and
   control the wireless communication device and execute an operation according to data of the TP-UD when the IED of the TP-UD is compliant with the remote control password.

13. The wireless communication device of claim 7 wherein the wireless communication device comprises a mobile phone.

14. A mobile phone, comprising:
   means for receiving a short message service (SMS) message;

means for determining whether a record code of a TP Protocol Identifier (TP-PID) stored within the SMS message is a remote control record code;

means for executing an operation at the mobile phone corresponding to TP-User-Data (TP-UD) stored within the SMS message if the record code of the TP-PID stored within the SMS message is the remote control record code; and means for displaying the SMS message on the mobile phone if the record code of the TP-PID stored within the SMS message is not the remote control record code.

15. A method, comprising:

receiving a text message at a wireless communication device;

analyzing a predetermined portion of the text message for a command code indicating an operation;

if the predetermined portion of the text message does not contain a command code, handling the text message by displaying the text message on the wireless communication device; and if the predetermined portion of the text message contains a command code, parsing the command code and performing the operation indicated by the command code.

16. The method of claim 15 wherein the operation comprises at least one of "volume increase," "volume decrease," "switch to silent mode," "switch to sound mode," and "turn off wireless communication device."

17. The method of claim 15 wherein the predetermined portion of the text message comprises a TP protocol identifier.

18. The method of claim 15, further comprising if the predetermined portion of the text message contains a command code, handling the text message by displaying the text message on the wireless communication device.

19. The method of claim 15 wherein the text message comprises a short message service (SMS) message.

20. The method of claim 15, further comprising if the predetermined portion of the text message contains a command code, parsing TP-User-Data to obtain the operation.

21. The method of claim 15 wherein performing the operation comprises executing the corresponding operation according to an information element identifier (IEI) and an information element data (IED) stored within the text message.

22. A wireless communication device, comprising:

a wireless communication module configured to receive a text message;

a logic unit configured to receive an indication of whether to activate a remote control function;

cause an activation variable to be "true" if the indication is to activate the remote control function, and "false" if the indication is not to activate the remote control function;

detect whether a command code is present in a predetermined portion of the text message;

if the activation variable is "true" and a command code is detected, perform an operation indicated by the command code; and if a command code is detected and the activation variable is "false," indicate that the wireless communication device did not accept the remote control function of the text message.

23. The wireless communication device of claim 22 wherein the logic unit is further configured to process the text message if the logic unit detects no command code in the predetermined portion of the text message.

24. The wireless communication device of claim 22 wherein the wireless communication module comprises a memory module configured to store data, a baseband circuit, an RF circuit, and an antenna.

25. The wireless communication device of claim 22 wherein the text message comprises a TP-protocol-identifier (TP-PID) field and a TP-user-data (TP-UD) field, and wherein the TP-PID field represents a type of text message capable of selecting a predetermine reserve value storing the command code.

26. The wireless communication device of claim 22 wherein the logic unit is further configured to perform the operation according to an information element identifier (IEI) and an information element data (IED) of the TP-UD stored within the text message.

27. The wireless communication device of claim 22 wherein the operation comprises at least one of "volume increase," "volume decrease," "switch to silent mode," "switch to sound mode," and "turn off wireless communication device."

28. The wireless communication device of claim 22 wherein the predetermined portion of the text message comprises a TP protocol identifier.

29. The wireless communication devcie of claim 22 wherein the predetermined portion of the text message comprises TP user data.

* * * * *